May 26, 1959 J. L. CULBERTSON 2,888,519
CODE-RINGING CALL-INTERCEPTING TELEPHONE SYSTEM
Filed July 9, 1954 2 Sheets-Sheet 1
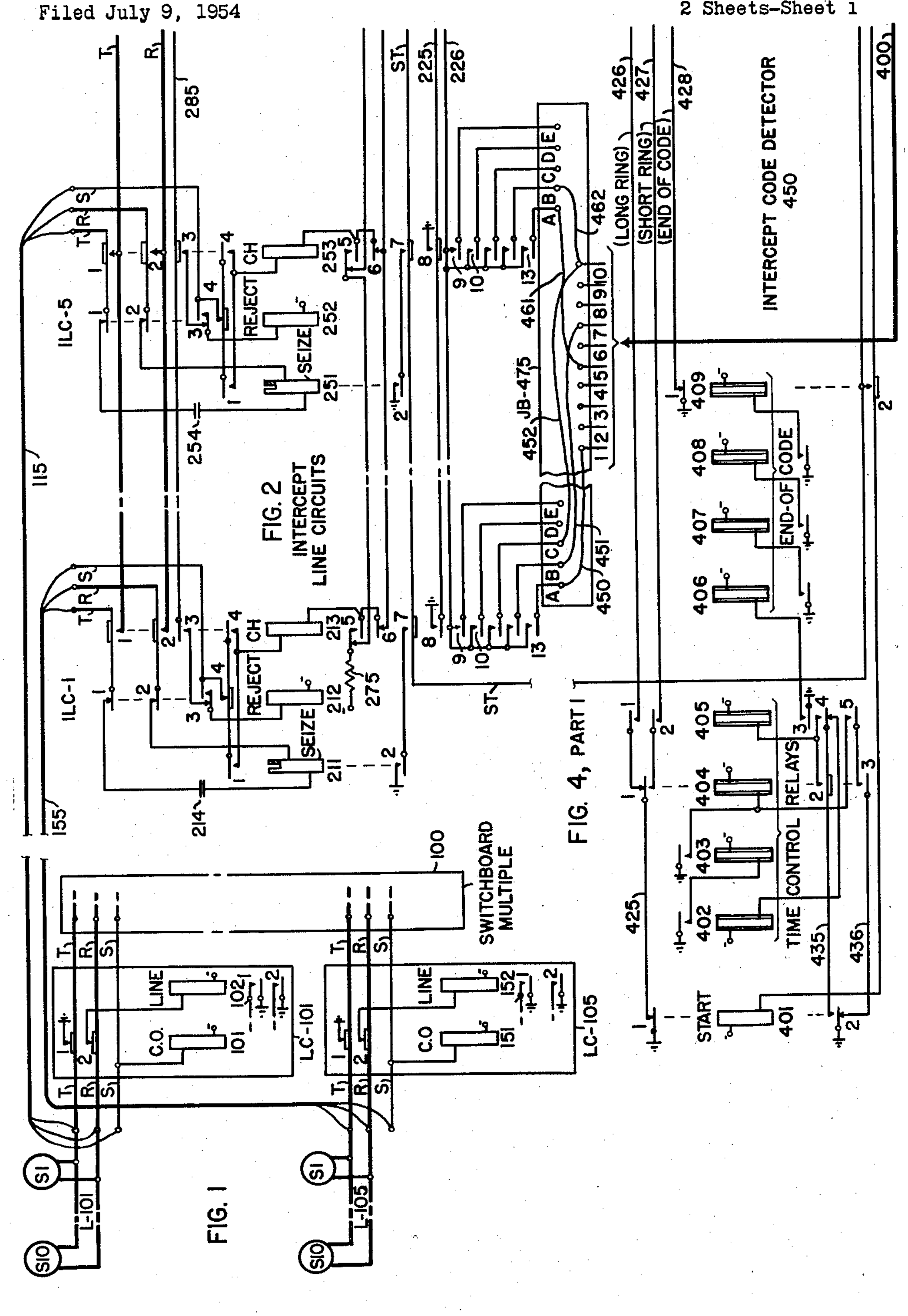
FIG. 1, FIG. 2, FIG. 4, PART I CODE-RINGING CALL-INTERCEPTING TELEPHONE SYSTEM
Filed July 9, 1954
2 Sheets-Sheet 2
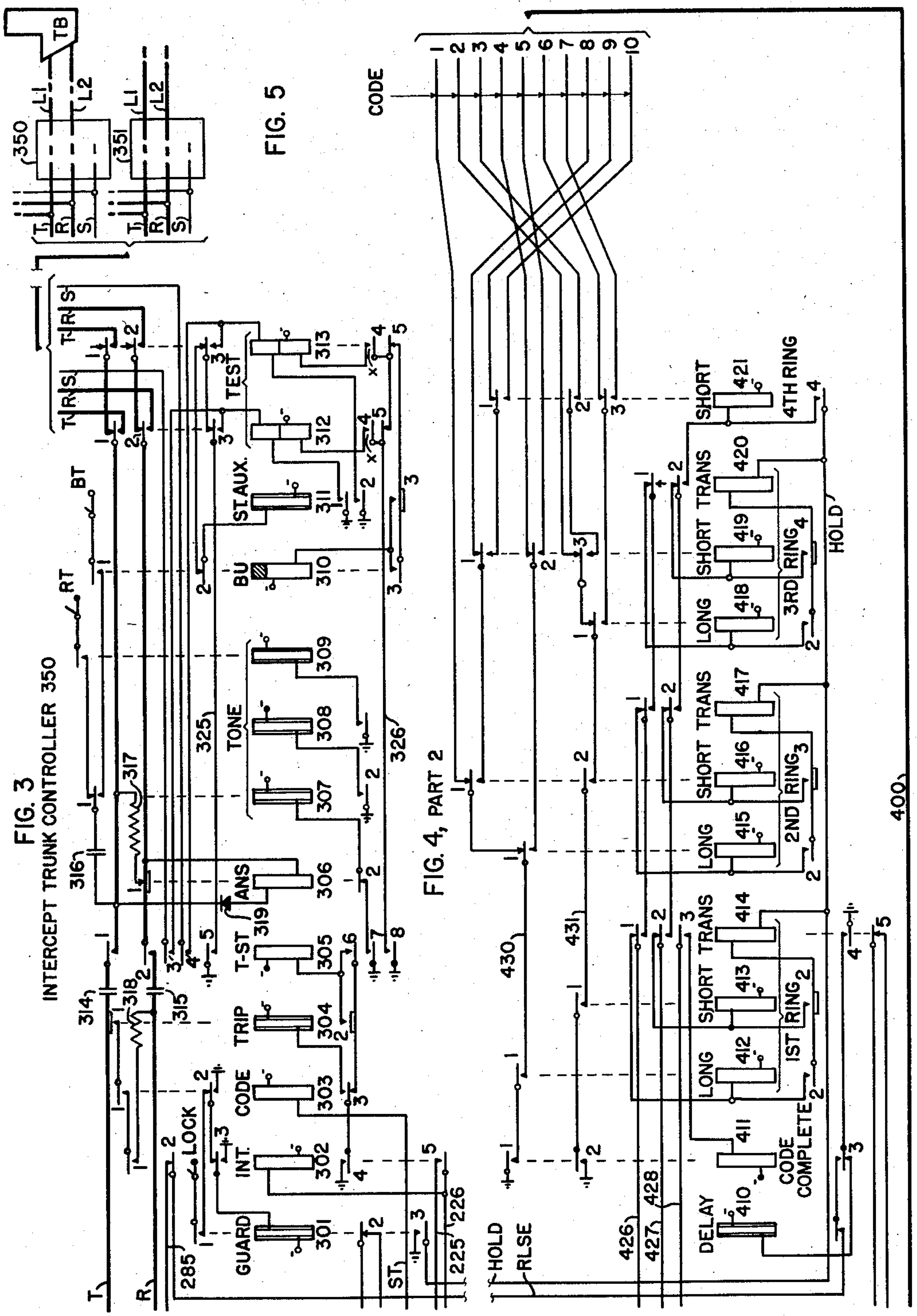
FIG. 3, FIG. 4, PART 2, FIG. 5

2,888,519
Patented May 26, 1959

2,888,519

CODE-RINGING CALL-INTERCEPTING TELEPHONE SYSTEM

John L. Culbertson, Harvey, Ill., assignor to International Telephone and Telegraph Corporation, a corporation of Maryland Application July 9, 1954, Serial No. 442,391

11 Claims. (Cl. 179—27)

This invention relates to a code-ringing call-intercepting telephone system. Its principal object is to provide a new and improved call-intercepting arrangement for enabling intercepting service to be given to any code-ringing party line from which one or more stations have been disconnected.

General description

It has been chosen to illustrate the invention as applied to a code-ringing party-line telephone system employing a single frequency ringing system, although it is applicable to ringing systems employing coded multi-frequency ringing.

A specific object of the invention is to provide detecting equipment common to a number of lines on intercept service for determining which station on a called one of the lines is the called one, by detecting the code of the applied ringing current.

A feature of the invention resides in an arrangement, including time-controlled relays, in the detecting equipment for distinguishing between long rings and short rings. In this arrangement each ring of any complete ringing code is recorded on a separate relay recorder, with each recorder marking the length of the recorded ring.

Other features relate to arrangements for avoiding false recordal response to partial codes, and for detecting the end of a code being recorded.

Other objects and features will become apparent as the description progresses.

The drawings

Referring now to the drawings, comprising Figs. 1 to 5, Fig. 1 shows two party lines connected for intercept service; Fig. 2 discloses intercept line circuits assignable to any of the party lines for intercepting service; Fig. 3 shows an intercept trunk controller 350 for connecting the calling line of an intercepted call to the intercept operator; Fig. 4, parts 1 and 2, disclose an intercept code detector 450 for detecting the ringing code of an intercepted called line; and Fig. 5 shows intercept trunks 350 and 351, and associated toll board TB.

Referring now to Fig. 1 of the drawings, it will be observed that two lines, L–101 and L–105 are illustrated, together with their associated line circuits LC–101 and LC–105. These line circuits are connected to the switchboard multiple 100 in the usual way and all connections to lines L–101 and L–105 reach their associated line circuits through switchboard multiple 100.

Each of the lines are illustrated as 10-party lines having stations S1 to S10 thereon. The ringers (not shown) of each station are responsive to a single frequency and a desired subscriber is signalled by coding the ringing current applied to the line, each subscriber on any one line being assigned a different code.

The switching equipment for lines L–101 and L–105 is assumed to be of the type which employs a finder to connect an idle link to a calling line and which employs a connector to make connections to called lines.

When all the substations on a party-line are equipped and connected for normal service there is no need for intercepting service, but when one of the substations is disconnected, either because the subscriber thereat discontinue telephone service temporarily or permanently, or has moved to a new location and has a new number assigned thereto, it is desirable that the lines be provided with intercepting service for a sufficient period of time to acquaint the other subscribers generally with the fact that such subscriber is not to be reached by calling his previously listed telephone number. Lines so connected for this service are said to be on intercepting service.

The equipment for providing intercepting service for a party line includes a sufficient number of intercept line circuits ILC–1 and ILC–5 of Fig. 2 in which a separate one may be connected to each party line in need of intercepting service. The number of intercept line circuits provided would ordinarily be much less than the total number of party lines and will vary according to the number of party lines in use and according to the type of locality in which this system is installed.

In order that calls to either of the illustrated lines be intercepted, a jumper such as jumper 115 or 155 is extended to the tip, ring, and sleeve conductors of the line circuits of the lines to be intercepted, such jumper connecting the selected lines to an idle one of intercept line circuits ILC–1 to ILC–5.

Referring now to Fig. 2 of the drawings, it will be observed that five intercept line circuits are indicated, the first and last being the only ones shown. The intercept line circuits each include a bridged ring-up seize relay which controls the operation of a chain relay to individualize the intercept line circuit with the common control apparatus. Each intercept line circuit also includes a reject relay which is operable to free the common equipment after the intercepting operation has been completed or after it is determined that the call is not to be intercepted.

Contacts 9 through 13 of the chain relays are provided with terminals on jumper board JB–475 to permit up to five stations on any particular line to be on intercept service. In the event that codes 1, 3, 5, 7, and 9 are to be intercepted, wires A through E are connected respectively to code wires 1, 3, 5, 7, and 9 of cable 400, it being assumed station S1 is assigned code 1, station S2 assigned code 2 and so forth. Responsive to the detection of the coded ring of the subscriber at a station to be intercepted, operation of code detector 450, as will hereinafter be described, grounds the corresponding one of the code wires to thereby start operations to extend the call to the intercept operator.

The five intercept line circuits are arranged in a preference lockout chain in order that only one line can seize the common equipment at any time.

Referring to Fig. 3, intercept trunk controller 350 includes equipment for extending a connection from the calling line to the intercept operator at toll board TB when the station being called is one to be intercepted. Controller 350 includes test relays 312 and 313 for selecting an idle one of the trunks extending to the toll board TB, such trunks also being used for other purposes. In this way, individual trunks for the intercept operator are rendered unnecessary.

Responsive to a call being extended to the intercept operator, an identifying tone is placed on the intercept trunk line for a short period of time to notify the operator that the call is an intercept call, as contrasted to other types of calls which may be handled over trunks 350 and 351.

Arrangements, hereinafter described, are provided in controller 350 for preventing partial codes from being received and erroneously detected.

In Fig. 4, an intercept code detector 450 is provided which is arranged to detect the code of the ringing current applied to a line on intercept. Responsive to code detector 450 being taken for use, each application of ringing current appearing on the called line causes operations to take place to detect and register the ring code information on ring-recording relays which are provided. After recording the code of the applied ringing current, one of ten code wires (code 1 to code 10) is energized and marks the transmitted code.

Referring now to Fig. 5 of the drawings, it will be observed that two operator trunks 350 and 351 are illustrated, such trunks serving to connect the toll board TB to the line being intercepted. Trunks 350 and 351 are common to a number of switchboard circuits and trunk selecting relays in controller 350 connect therewith when any such trunk is idle, thereby increasing the efficiency of intercept trunks.

The toll board TB is assumed to include all equipment required by an intercept operator.

*Detailed description*

The invention having been described generally, a detailed description will now be given with reference to Figs. 1 to 5.

*Outgoing calls*

Assuming now that the subscriber at substation S1 on line L–101 desires to make an outgoing call at the time that party line L–101 is idle, the closing of the line loop closes a direct-current bridge across the line conductors of the party line thereby operating the associated line relay 102.

Line relay 102 places ground potential on the group marking conductor associated with contact 1 and on the individual marking conductor associated with contact 2, thereby starting the well-known sequence of operations which results in finder action connecting line L–101 through switchboard multiple 100 to an idle selector or connector (not shown). When this connection has been made, ground potential appears on the sleeve conductor S of the line multiple to operate the cutoff relay 101 to clear the line and to restore line relay 102.

In order to effect the completion of the desired connection, the subscriber at station S1 operates the calling device (not shown) in accordance with the respective digits in the desired number, each operation resulting in the production of a corresponding series of circuit interruptions to operate automatic switching apparatus in the well-known manner to complete the connection.

When the connection has been completed and the subscriber at station S1 thereafter replaces the receiver, the automatic switching apparatus clears out in the usual manner and removes ground potential from the sleeve lead of the line circuit LC–101, permitting cutoff relay 102 to restore and line relay 101 to be reconnected.

*Incoming call*

When a subscriber on party line L–101 is called, connection is made with this line through the switchboard multiple 100 and ground potential is placed on the sleeve conductor S, bringing about the operation of the cutoff relay 101 to clear the called line of its line-relay bridge. Thereafter, ringing current of a single frequency, interrupted according to the code of the desired one of the stations S1 to S10, is transmitted over line L–101, actuating all ringers of the line. The call is then answered by the subscriber whose code is being transmitted.

Assuming that one of the stations such as S10 is disconnected from the partly line L–101, either because the subscriber thereat is desirous of temporary or permanent suspension of telephone service or has moved to a different locality served by another telephone line, all calls reaching party line L–101 and intended for station S10 should be intercepted and the calling subscriber should be notified of the changed condition.

The attendant or maintenance man at the telephone exchange may connect a jumper such as 115 from the tip, ring and sleeve conductors of line L–101 to the corresponding tip, ring and sleeve conductors of an idle intercept line circuit, such as ILC–5, to thereby render the intercepting line circuit ILC–5 temporarily individual to line L–101.

Since station S10 on line L–101 is the station whose calls are to be intercepted, the attendant also connects jumper 462 of jumper board JB–475 from an idle one of the leads A to E to the code wire that corresponds to the code assigned to station S10.

Jumper board JB–475 is shown connected for intercepting calls to stations S5 and S10 of line L–101 by jumpers 461 and 462, and is arranged to intercept calls to stations S1, S7 and S10 of line L–105 by jumpers 450 to 452. For purposes of disclosure, it is assumed that station S1 is assigned code 1, station S2 is assigned code 2, and station S10 is assigned code 10, such assignment and codes being shown in the following table.

*Ringing codes*

The following table shows the composition of the various codes 1 to 10 together with their assignment to stations S1 to S10 on any line L–101.

| Code | Code Composition | | | | Station Assignment |
|---|---|---|---|---|---|
| | 1st Ring | 2nd Ring | 3rd Ring | 4th Ring | |
| 1 | Long | | | | S1 |
| 2 | Short | Short | | | S2 |
| 3 | do | do | Short | Short | S3 |
| 4 | Long | Long | | | S4 |
| 5 | do | do | Short | | S5 |
| 6 | Short | Short | Long | | S6 |
| 7 | do | do | do | Short | S7 |
| 8 | Long | do | | | S8 |
| 9 | do | do | Short | | S9 |
| 10 | do | do | do | Short | S10 |

Ground potential appears on the lock lead Lock a fraction of a second before the start of any complete code and remains thereon until the completion of the longest code. The time interval between individual rings in a complete code is approximately three-tenths of a second; the interval between the end of one complete code and the start of the next is greater than three and one-quarter seconds and less than five and three-quarter seconds; the time duration of a long ring is approximately one second; and the time duration of a short ring is approximately one-half second.

*Intercepting operation*

The connecting of jumper 115 to an idle intercept line circuit such as ILC–5 conditions the associated intercept line circuit to cause all calls to the line L–101 to be tested and if such call is to be intercepted, aid in extending the call to the intercept operator or to reject such call if it is not to be intercepted.

With jumper 115 connected as illustrated, seize relay 251, in series with condenser 254, is bridged across the talking conductors T and R of line L–101 through break contacts 1 and 2 of reject relay 252. Relay 251 is so related to the capacity of condenser 254 and so adjusted that it does not respond to the potential changes which occur over the talking conductors in the party-line pursuant to the making of outgoing calls from this line. Seizing relay 251 is preferably of the shaded pole AC type indicated by the cross hatching of a portion of the upper part thereof and is therefore able to maintain its actuated armature attracted continuously throughout an application of ringing current.

When line L–101 is seized through the switchboard multiple 100 pursuant to a call to one of the stations thereon, ground potential appearing on the sleeve conductor S is extended to the sleeve conductor of jumper 115 preparatory to the operation of the intercept line circuit ILC–5.

Following the seizure of the line L–101, coded ringing current is impressed intermittently according to the code of the called party across the tip and ring conductors thereof to signal the desired subscriber. A portion of this ringing current is transmitted over the tip and ring conductors of jumper 115 and through break contacts 1 and 2 of reject relay 252 to seize relay 251. Relay 251 operates and remains operated during each application of ringing current and restores on the cessation of such applications.

Assuming that intercept code detector 450 and intercept trunk controller 350 are idle, ground potential from the sleeve conductor is extended through break contacts 4 of reject relay 252 and through make contacts 1 of seize relay 251 to one side of the winding of the chain relay 253, the other side of relay 253 being connected to idle-indicating battery potential through current-limiting resistor 275, break contacts 5 of all unoperated chain relays, break contacts 2 of guard relay 301, and break contacts 6 of chain relay 253.

Chain relay 253 operates from the current flow from ground on the sleeve conductor S to battery at resistor 275, and at its make contacts 5 locks operated and opens the operate circuit of all remaining chain relays of the remaining four intercept line circuits ILC–1 to ILC–4.

In the event that two lines on intercept were called simultaneously, the lower-numbered intercept line circuit has operating preference, as its make contacts 5 are closer to the battery supply, as regards the chain circuit.

Responsive to the operation of seize relay 251 in accordance with the coded ringing current applied to line L–101, and the consequent operation of chain relay 253 of the associated intercept line circuit, make contacts 1 and 2 of relay 253 extend the tip and ring conductors of the calling line to condensers 314 and 315 of the intercept trunk controller 350 in preparation for extension of a connection to the intercept operator; make contacts 3 connect the release conductor 285 to one side of the battery-connected winding of reject relay 252 in the event the current call is not to be intercepted; make contacts 4 lock the chain relay 253 operated independently of seize relay 251; make contacts 7 together with make contacts 2 of seize relay 251 intermittently ground start conductor ST in accordance with the coded ring; make contacts 8 ground conductor 225; and make contacts 9 to 13 connect wire 226, associated with intercept relay 302, to the five leads A to E of jumper board JB–475.

Responsive to the appearance of ground on the start wire ST, code relay 303 of controller 350 is operated and at its make contacts 2 extends ground potential through break contacts 3 of unoperated intercept relay 302 to the battery-connected winding of guard relay 301; at its make contacts 1 prepares a circuit to stop the ringing in the event that the call is to be intercepted; and at its make contacts 3 prepares an operate circuit for the trip relay 304.

At the same time, the ground appearing on the start wire ST is extended through break contacts 5 of the transfer relay 414 (Fig. 4, part 2) of the first ring-recording group to the battery-connected winding of start relay 401 of intercept code detector 450.

In the event the call to line L–101 is not to be intercepted, as will hereinafter be described, ground appears on wire 285 and is extended through make contacts 3 of relays 253 and 252 to the battery-connected winding of reject relay 252. Relay 252 then operates and locks operated to the ground potential on the sleeve conductor S of the called line; its break contacts 4 open-circuit relay 253; and its contacts 1 and 2 disconnect the seize relay 251. Chain relay 253 restores and frees the common equipment, subject to the release of the guard relay, such relay operation described hereinafter. Responsive to the completion of the call to line L–101 which is not intercepted, ground disappears from the sleeve conductor and relay 252 restores, freeing the associated intercept line circuit.

Each time ringing current is applied to the called line, the seize relay of the associated intercept line circuit is operated at the start of each intermittent application of ringing current and is held operated until its completion. In the event that the first ring is a long ring, the associated seize relay remains operated for the time interval of a long ring, comprising approximately one second, and in the event the ring is a short ring, the seize relay remains operated for approximately one-half second.

Responsive to the operation of start relay 401 from ground on start wire ST, ground potential at its contacts 2 is extended through break contacts 4 of time-control relay 405 to the battery-connected winding of relay 402. At the same time, break contacts 1 of relay 401 remove ground from normally-grounded conductor 425.

Relay 402 operates and operates relay 403. Relay 403 operates and operates relay 404. Responsive to the operation of relay 404, its make contacts 2 extend ground potential to the battery-connected winding of relay 405.

Relay 405 operates and locks operated through its make contacts 4, independently of relay 404 but under control of relay 401; its make contacts 2 connect wire 425 to wire 427; its break contacts 4 open-circuit the operate path of relay 402; and its make contacts 5 prepare a locking circuit for relay 404, when start relay 401 restores.

Relay 402 restores after a slight delay, relays 402 to 405 being slow-restoring as indicated by the copper sleeve under their windings, and opens the operate circuit of relay 403. Relay 403 restores after a slight delay and opens the operate circuit of relay 404. If relay 401 is still operated, relay 404 restores and transfers wire 425 from wire 427 to wire 426. The release time of relays 402, 403, and 404 restoring in sequence is greater than one-half second duration, such time interval being critical to differentiate between a long ring and a short ring.

On completion of one ring of a complete ringing code, start relay 401 restores and grounds wire 436, thereby extending locking ground to the battery-connected winding of relay 404 through break contacts 5 of relay 405. At the same time code relay 303 restores and guard relay 301 is locked operated through its contacts 1 to ground on conductor Lock.

In the event that the ring is a short ring, being approximately of one-half second duration, relays 402 and 403 have restored when relay 401 is released on the ungrounding of start wire ST. Relay 404 is still operated responsive to the slow-release characteristics of relays 402 and 403. In this event, relay 404 locks operated to the ground on wire 436 from back contacts 1 of relay 401. At such time, with relays 404 and 405 operated and start relay 401 restored, ground potential on wire 425 is extended through make contacts 1 of relay 404 and make contacts 2 of relay 405 to conductor 427. A short time later, relay 405 restores, its operate circuit opened when ground was removed from wire 435 responsive to the restoration of relay 401. Locking ground is now removed from the winding of relay 404 and from conductor 427. Relay 404 restores a short time later, returning the time control relays to normal condition.

In the event that the ring is a long ring, being of one second duration, when start relay 401 restores responsive to the cessation of the received ringing current, relay 404 has already restored and relay 405 is still maintained operated, although it is open-circuited at contacts 2 of relay 401. Ground potential from break contacts 1, appearing on wire 425, is extended through break contacts 1 of now restored relay 404 and make contacts 1 of operated relay 405 to control wire 426.

A short time later, relay 405 restores and the ground is removed from wire 426.

Responsive to each operation of relay 405, its make contacts 3 operate relay 406 to cause relays 406 to 409 to operate sequentially. Responsive to the operation of relay 409, ground potential is removed from normally-grounded wire 428 extending to the code-complete relay 411. Responsive to each restoration of relay 405, relays 406 to 409 restore sequentially, each relay being slow-restoring due to the indicated copper sleeve under its winding, and wire 428 is regrounded.

The release time of relays 406 to 409 is greater than one second and less than three seconds. Accordingly, since the time intervals between codes in any ring is less than one second and the time interval between complete codes is greater than three seconds, wire 428 is ungrounded at the start of the first ring of any code and is maintained ungrounded until the completion of such code.

Briefly then, ground appears momentarily on wire 426 responsive to each long ring and on wire 427 responsive to each short ring. Additionally, ground appears on wire 428 responsive to the completion of each code.

Referring now to Fig. 4, part 2 of the drawings, it will be observed that there are four groups of ring-recording relays; relays 412 to 414 for recording the first ring, relays 415 to 417 for recording the second ring, relays 418 to 420 for recording the third ring, and relay 421 for recording the fourth ring.

Each ring-recording relay group, with the exception of the last, comprises a long-ring recording relay, a short-ring recording relay and a transfer relay. The last ring-recorder has only a short-ring relay as the fourth ring on any code is always a short ring.

Assuming that station S10 is to be intercepted, the ringing chart indicates that the transmitted ringing code is a single long ring and three short rings. As hereinbefore described, start relay 401 grounds conductor 426, responsive to the first ring of the concerned code and extends ground potential from conductor 426 through break contacts 1 of transfer relay 414 to the battery-connected winding of long-ring relay 412.

Long-ring relay 412 operates and locks operated at its make contacts 2. When ground is removed from wire 426, transfer relay 414 operates in series with relay 412 to ground on conductor Hold from make contacts 3 of guard relay 301.

Make contacts 1 and 2 of transfer relay 414 transfer wires 426 and 427 from the first-ring recording group to the second-ring recording group to record the next ring in the event that one is forthcoming; contacts 3 connect wire 428 to the battery-connected winding of the code-complete relay; contacts 4 extend ground potential through break contacts 3 of code-complete relay 411 to the battery-connected winding of delay relay 410; and contacts 5 open the operate circuit of relay 401, leaving it under control of relay 409. In the event that relay 409 restores, relay 401 is disabled until the common equipment is released and reseized.

Responsive to the second ring of code 10, ground appears on wire 427 as the second ring is a short ring.

Relay 416 of the second group of ring-recording relays operates and functions in a manner similar to relay 412. Transfer relay 417 of the second-ring recorder operates and transfers wires 426 and 427 to relays 418 to 420.

The third operation of relay 401 to mark the third ring again grounds wire 427 and relay 419 operates. Transfer relay 420 transfers wire 427 to relay 421 which operates responsive to the grounding of wire 427 to mark the fourth ring.

During the recording of the four rings of code 10, delay relay 410 is maintained operated from ground at contacts 4 of relay 414 and wire 428 is held open, as the time intervals between rings did not exceed the release time of relays 406 to 409.

With the receipt and registration of the fourth ring of code 10, relay 401 fails to operate until the start of the code 10 for the second time. As pointed out before, such interval exceeds the slow release time of relays 406 to 409 in series and they restore in sequence.

Responsive to the restoration of relay 409, contacts 1 ground wire 428 and open-circuit the operate path of relay 401.

Code complete relay 411 operates and at its contacts 1 and 2 ground wires 430 or 431 depending on whether relay 412 or 413 is operated, and at its contacts 3 open-circuits delay relay 410.

Since relays 412, 416, 419, and 421 are operated, ground potential from make contacts 2 of relay 411 is extended to code wire Code-10 extending to jumper board JB-475.

After a substantial fraction of a second, relay 410 restores, it being slow-restoring because of its indicated copper sleeve under its winding, and at its contacts extends ground potential to wire *Rlse* extending to contacts 2 of relay 302 of Fig. 3.

If the ringing current applied to the intercepted line is the code of a station being intercepted, the ground on code wire 10 is extended over jumper 462 and through one of the make contacts of operated chain relay 253 to wire 226 extending to the battery-connected winding of intercept relay 302.

Intercept relay 302 operates and at its make contacts 2 opens the operate circuit of the reject relay 252 of the associated intercept line circuit by opening wire 285 from the release wire *Rlse,* not yet grounded because of the delay introduced by relay 410. Make contacts 1 close a preparatory circuit for tripping the ringing circuit of the calling connector; make contacts 3 extend ground potential to the battery-connected winding of the operated guard relay 301; make contacts 4 prepare an operate circuit for trip relay 304; and make contacts 5 locks it operated to ground appearing on wire 225 from make contacts 8 of the operated chain relay.

Shortly thereafter slow-restoring relay 410 restores, but break contacts 2 of intercept relay 302 prevent the ground appearing on the release wire *Rlse* from operating reject relay 252.

Assuming that code 5, comprising two long rings and one short ring is to be detected, the operation of intercept code detector 450 is briefly as follows:

The seize relay of the associated intercept line circuit places ground potential on the start wire ST in accordance with the length of the ring being detected, as hereinbefore described. The start relay 401 operates and restores in the manner hereinbefore described to ground control wire 425 to extend ground potential to the concerned one of the ring control wires 426 and 427.

Under the assumption that code 5 is the code being called, ground potential appears on wire 426 in response to a long ring and is extended through break contacts 1 of transfer relay 414 to the battery-connected winding of long-ring relay 412 which operates and locks as hereinbefore described. Responsive to the restoration of the time relay 405 and the consequent removal of ground from wire 426, transfer relay 414 operates in series with operated relay 412 to ground on wire Hold. Contacts 1 and 2 on transfer relay 414 transfer wires 426 and 427 to the next ring recording group of relays; and make contacts 4 extend ground potential through break contacts 3 of code-complete relay 411 to the battery-connected winding of relay 410. Relay 410 operates and at its break contacts open the release wire *Rlse.*

Since code 5 comprises three rings, start relay 401 operates again before end-of-code relay 409 restores and the operate circuit of code complete relay 411 is not completed.

Ground potential appears on the control wire 426 responsive to the second long ring and is extended through make contacts 1 of transfer relay 414 and break contacts 1 of transfer relay 417 to the battery-connected winding of long-ring relay 415 which operates and locks. On completion of the second ring and the consequent restoration of relay 405, transfer relay 417 operates in series with relay 415 to the noted grounded hold wire Hold. Contacts 1 and 2 on relay 417 transfer wires 426 and 427 to the third group of ring-recording relays.

Responsive to the third operation of start relay 401 in response to a short ring, wire 427 is grounded in the manner hereinbefore described and the ground thereon is extended through make contacts 2 of relays 414 and 417 to the battery-connected winding of the short-ring relay 419 which operates and locks.

On completion of the short ring, ground is removed from wire 427 and transfer relay 420 operates in series with relay 419 to the ground on wire Hold, as hereinbefore noted. At its contacts 2, relay 420 transfers wire 427 to the battery-connected winding of relay 421 in preparation for the recording of the fourth ring, if such ring is forthcoming.

Start relay 401 does not operate for the fourth ring as code 5 contains only three rings, and as hereinbefore pointed out, after a slight delay relay 409 restores and grounds wire 428.

Code-complete relay 411 operates and at its make contacts 3, open-circuits the operate path of relay 410 which restores a fraction of a second later.

At such time, assuming code 5 is connected to intercept relay 302 over a jumper such as 461 and associated chain relay contacts, relay 302 operates and opens the operate circuit of reject relay 252, as noted.

Assuming that ringing code 5, appearing on line L–101, is not to be intercepted, jumper 461 is not connected and the ground appearing on wire 430 is not extended to the operate circuit of the intercept relay 302. Responsive to the noted restoration of delay relay 410, ground potential is extended over wire R*lse* and through break contacts 2 of the unoperated intercept relay 302 to the battery-connected winding of reject relay 252.

Reject relay 252 operates and locks to the ground on sleeve conductor S. Its contacts 4 open-circuit relay 253 which thereupon restores, freeing the common equipment and its contacts 1 and 2 disconnect relay 251 from the called line. All relays are now restored with the exception of seize relay 252 and guard relay 301. On completion of the current code, ground is removed from the lock wire permitting relay 301 to restore and complete the operate circuit for the chain relays of the remaining unoperated line circuits.

On completion of the call that was not intercepted, disconnect by the calling party removes ground from the sleeve conductor S and relay 252 restores.

Intercept line circuit ILC–5 is now returned to normal condition and succeeding calls to its associated line again are tested as described.

Assuming code 7, comprising one long ring and one short ring, is to be detected, start relay 401 grounds wire 426 to register the long ring on relay 412 and grounds control wire 427 to operate short ring relay 416, in a manner previously described. The operation of the intercept code detector in marking the detected code wire and in grounding the release wire on clearout, is as hereinbefore described.

Referring now to Fig. 3 of the drawings, responsive to the grounding of the start wire ST by the operation of a seize relay such as 251 and the operation of chain relay 253 of the concerned intercept line circuit, code relay 303 operates and remains operated as long as the concerned seize relay is operated.

Contacts 1 of code relay 303 closes a point in the ring-tripping circuit in order to trip the ringing current in the calling connector; make contacts 2 place ground potential on the battery-connected winding of guard relay 301; and make contacts 3 prepare an operate circuit for delay relay 304.

Guard relay 301 operated as noted and at its make contacts 1 prepares to lock itself operated under control of the lock lead Lock which, as hereinbefore noted is grounded at the beginning of the first ring of a complete code and maintained grounded until the end of the last ring of the longest code; its break contacts 2 open the operate circuit of the chain relay of all the intercept line circuits; and its make contacts 3 ground the hold conductor Hold as hereinbefore noted.

Assuming the intercepted call is one to be intercepted, the appearance of ground on wire 226 from the selected one of the code wires code 1 to code 10 (grounded by operation of the code detector 450) operates intercept relay 302 which locks operated through its make contacts 5 to grounded conductor 225. Make contacts 1 of relay 302 closes another point of the ring-tripping circuit; its break contacts 2 open the operate circuit of the reject relay, as hereinbefore noted; and its make contacts 3 place the locking control of the guard relay under the control of the intercept relay.

At such time, since wire 226 became grounded at a time when no ringing current is on the called line (the interval between complete codes) code relay 303 is restored.

Responsive to the application of ringing current to the called line on the start of the ringing of the ringing code for the second time, seize relay 251 grounds start wire ST.

Relay 401 of detector 450 does not operate as its operate circuit is open at contacts 2 of relay 409 and at contacts 5 of transfer relay 414.

Code relay 303 operates in accordance with the operation of any seize relay and at its contacts 1 close a point in the connector tripping circuit, and at its make contacts 3 prepare an operate circuit for the trip relay 304.

Relay 304 operates and at its contacts 1, places resistance 318 across the tip and ring conductors of the called line to trip the ringing in the associated connector.

Responsive to the tripping of the ringing circuit of the calling connector, ringing current is removed from the line and seize relay 251 and code relay 303 restore. Ground potential is extended through break contacts 3 of restored relay 303 and make contacts 2 of yet operated trip relay 304 to the battery-connected winding of tone-start relay 305 which operates and locks operated through its make contacts 6. A short time thereafter, trip relay 304 restores, removing the resistance bridge from across the tip and ring conductors.

Make contacts 1 and 2 of tone-start relay 305 extend the tip and ring conductors through condensers 314 and 315 to contacts 1 and 2 of the test relays 312 and 313; make contacts 3 and 4 connect the sleeve wires of the intercept operator trunks to one side of the winding of each of the test relays 312 and 313; contacts 5 ground wire 325, thereby preparing an operate circuit for the start auxiliary relay 311; make contacts 7 closes an operate circuit for tone relay 307; and make contacts 8 ground locking conductor 326.

Relay 307 operates, operating relays 308 and 309 in sequence.

Start auxiliary relay 311 operates from ground on wire 325 through break contacts 3 of test relays 312 and 313, and break contacts 2 of busy relay 310. Its contacts 1 and 2 extend ground potential on one side of the upper winding of each of the test relays 312 and 313 and its make contacts 3 complete the operate circuit for slow-operating busy relay 310.

With ground potential on one side of the upper winding of each of the test relays and with the other side thereof connected to the sleeve conductors of the operator trunks, battery potential appearing on an idle one of such trunks, causes the concerned test relay to operate.

Assuming both operator trunks, 350 and 351, to be idle, test relays 312 and 313 both operate and try to lock operated through their lower windings. However, with the fixed order of preference, test relay 312, upon operating, opens the locking circuit of the lower winding of test relay 313, thereby permitting it to restore when start auxiliary relay 311 restores. Contacts 3 of either operated test relay open the operate circuit of start auxiliary relay 311 and it restores a short time later, it being slow-restoring.

Busy relay 310 being slow-operating because of the indicated copper collar surrounding its armature end, fails to operate as responsive to the operation of either test relay, its operate circuit is opened.

With test relay 312 operated and locked operated, its contacts 1 and 2 extend the tip and ring conductors thereof to the associated operator trunk 350 extending to toll board TB.

At such time, resistance 317 is bridged across the tip and ring conductors to seize the connected operator trunk and to signal the operator in the well-known manner.

Guard relay 301, intercept relay 302, test-start relay 305, tone relays 307 to 309, and test relay 312 are operated in controller 350 and the toll operator at toll board TB is signalled that a call is waiting in the well-known manner by the associated trunk 350 or 351.

Responsive to answer by the intercept operator, current-flow across the tip and ring conductors T and R is reversed and current now flows through rectifier 319 and the winding of relay 306. Rectifier 319 is so connected that no current flows therethrough until the normal tip and ring conductor battery polarity is reversed. Relay 306 operates and at its contacts 1 remove the resistance bridge from across the tip and ring conductors, and its break contacts 2 open the operate circuit of the tone relays 307 to 309, thereby permitting them to restore sequentially.

Responsive to the restoration of relay 307 and the continued operation of relay 309 for a substantial period of time, determined by the slow-release characteristics of relays 308 and 309, ring tone from ring-tone lead RT is extended through make contacts of tone relay 309, break contacts 1 of relay 307, and condenser 316 to the tip conductor T extending to the intercept operator, thereby notifying her that the call is an intercept call. A short time later relays 308 and 309 restore.

The intercept operator is now connected to the calling party and may converse therewith.

Responsive to disconnect by the calling subscriber, ground potential is removed from the sleeve conductor S thereby permitting chain relay 253 to restore. Responsive to the restoration of chain relay 253, ground is removed from conductor 225 and intercept relay 302 restores thereby restoring test-start relay 305. Test-start relay 305 restores and permits the operated test relay to restore.

Guard relay 301 which is now locked operated to the ground potential appearing on the locked conductor Lock maintains the chain circuit for the intercept line circuits open. On completion of the longest code, ground potential is removed from the lock lead and guard relay 301 restores. With the restoration of guard relay 301, the chain circuit for the intercept line circuits is again closed and another call may be intercepted.

In the event that all trunks extending to the intercept operator at toll board TB are busy, the ground potential appearing on the sleeve conductor S thereof short-circuits test relays 312 and 313, preventing their operation. After a short period of time, the ground potential on wire 326, extending through break contacts 5 of either of the test relays to the battery-connected winding of busy relay 310, operates slow-operating busy relay 310. At its make contacts 1 relay 310 applies busy tone to the calling line through contacts 1 of relay 307 and tone condenser 316, thereby signalling the calling line to disconnect.

I claim:

1. In a telephone system including code-ringing party lines with the stations on any line each being assigned a distinctive code of ringing-current signals, intercept line circuits and means for connecting them to respective ones of the party lines which have stations disconnected therefrom, code-test means common to all intercept line circuits, means in any intercept line circuit responsive to the beginning of an application of a code of ringing-current signals to a called line to which it is connected for temporarily individualizing such intercept line circuit and connected line with the code-test means, means in the code-test means for recording each signal in the last said application of ringing-current signals to the individualized line, marking means controlled by the recording means for marking the identity of the code represented by the recorded signals, and indicating means separately adjustable for each line circuit and controlled by the marking means for indicating whether the call is for a connected station or for a disconnected station, an intercept trunk, and means responsive to the call being indicated as for a disconnected station for connecting the called line to the intercept trunk.

2. In a telephone system according to claim 1, means responsive to the call being indicated as for a connected station for thereupon terminating the said individualization.

3. In a telephone system according to claim 2, the said means for terminating the individualization when the call is indicated as for a connected station including separate means in each line circuit for locking such line circuit out of service until the called line becomes free.

4. In a telephone system according to claim 1, the means for indicating that the call is for a disconnected station including timing means permitting time for the call to be first marked as for a disconnected station, together with means for marking the call as for a connected station if it has not been marked as for a disconnected station during the said permitted time.

5. In a telephone system according to claim 1, wherein certain of the said ringing codes are distinguished from each other according to whether a ring thereof is a long or is a short ring, ring-response means in the code-test means for marking the beginning and for marking the end of any ring of a code applied to an individualized line, means controlled by the ring-response means for operating the means for recording the respective rings of a code, and timing means controlled by the ring-response means for causing any recorded ring to be recorded as of one identity or another according to its length.

6. In a telephone system according to claim 1, ring-response means in the code-test means for marking the beginning and for marking the end of any ring of a code applied to an individualized line, timing means controlled by the ring-response means according to the time between successive rings, code-end means controlled by the timing means for indicating the end of a code, and means controlled by the code-end means for initiating the marking of the identity of the recorded ringing code.

7. In a telephone system according to claim 1, means for terminating the temporary individualization responsive to the call being indicated as for a connected station and responsive to the connection being cleared out following a said connection of the called line to the intercept trunk when a disconnected station is indicated, guard means associated with the code-test means, and means for operating the guard means during any said individualization to prevent a succeeding individualization from occurring except responsive to the first ring of a code applied to a called line.

8. In a telephone system including code-ringing party lines, intercept line circuits and line jumper means for connecting them to respective ones of said party lines having stations disconnected therefrom, code jumper means for adapting any connected line circuit according to the stations disconnected from the line to which the line circuit is connected, test means common to all said intercept line circuits, means in any intercept line circuit responsive to the beginning of a code of ringing signals applied to a called line to which it is connected for temporarily individualizing such intercept line circuit with the common test means, code-test means in the common test means for testing the last said code of ringing signals, selecting means controlled jointly by the code-test means and by the code-jumper means for ascertaining whether the call is for a disconnected station or for a connected station, intercept trunks, and connecting means controlled by the selecting means when the call is ascertained to be for a disconnected station for connecting the called line to an intercept trunk responsive to a further application of ringing signals to the called line.

9. In a telephone system according to claim 8, said connecting means including trip means responsive to the said further application of ringing current for temporarily bridging the called line to trip the ringing operation.

10. In a party-line call-intercepting system wherein the intercepting operation is controlled by ringing current applied to called lines having stations disconnected therefrom, intercepting means and means for associating any said called line therewith, test means for determining whether the call to the associated line is for a disconnected station or for a connected station, an intercept trunk and means for marking it busy when in use, means controlled by the test means responsive to the call being for a disconnected station for tripping the ringing operation and for extending an intercept connection from the called line to the intercept trunk if it is idle, and means for applying a tone signal to the called line subject to the intercept trunk being marked busy.

11. In a call-intercepting system for use in a code-ringing party-line telephone system wherein any station on a called party line may be signalled repeatedly by repeated applications of its ringing code to the line, a first group of timing relays controlled from the called line by the ringing current for indicating the length of each ring in a ring code, a second group of timing relays controlled by the first group for indicating the end of the application of the ringing code to the called line, and means controlled by the second group of timing relays for rendering the first group non-responsive to succeeding applications of the ringing code to the called line.

References Cited in the file of this patent

UNITED STATES PATENTS

| | | |
|---|---|---|
| Re. 22,958 | Davidson | Jan. 6, 1948 |
| 2,285,282 | Jones | June 2, 1942 |
| 2,379,456 | Rhoades | July 3, 1945 |
| 2,508,644 | Jones | May 23, 1950 |
| 2,542,749 | Bruckart | Feb. 20, 1951 |
| 2,608,620 | Kessler | Aug. 26, 1952 |